(12) United States Patent
Penny et al.

(10) Patent No.: US 7,237,021 B2
(45) Date of Patent: Jun. 26, 2007

(54) NETWORK-ATTACHED STORAGE SYSTEM, DEVICE, AND METHOD SUPPORTING MULTIPLE STORAGE DEVICE TYPES

(75) Inventors: Brett A. Penny, Milpitas, CA (US); Neil A. Clarkson, Newbury (GB); Geoffrey S. Barrall, San Jose, CA (US)

(73) Assignee: BlueArc UK Limited, Bracknell, Berkshire (GB)

(*) Notice: Subject to any disclaimer, the term of this patent is extended or adjusted under 35 U.S.C. 154(b) by 790 days.

(21) Appl. No.: 10/407,145

(22) Filed: Apr. 4, 2003

(65) Prior Publication Data
US 2004/0199515 A1 Oct. 7, 2004

(51) Int. Cl.
*G06F 15/173* (2006.01)
(52) U.S. Cl. .................................... 709/223; 711/112
(58) Field of Classification Search ................ 709/215, 709/216, 220–226, 223; 711/111, 150, 170, 711/112
See application file for complete search history.

(56) References Cited

U.S. PATENT DOCUMENTS

| | | | |
|---|---|---|---|
| 6,425,034 B1 | 7/2002 | Steinmetz et al. | 710/129 |
| 6,446,141 B1 | 9/2002 | Nolan et al. | 710/8 |
| 6,496,914 B1* | 12/2002 | Sonner et al. | 711/170 |
| 6,738,854 B2* | 5/2004 | Hoese et al. | 710/315 |
| 6,898,634 B2* | 5/2005 | Collins et al. | 709/226 |
| 6,938,123 B2* | 8/2005 | Willis et al. | 711/114 |
| 7,062,516 B2* | 6/2006 | Bhat | 707/202 |
| 2002/0062387 A1 | 5/2002 | Yatziv | 709/236 |
| 2002/0099906 A1* | 7/2002 | Chan et al. | 711/111 |
| 2002/0143942 A1* | 10/2002 | Li et al. | 709/225 |
| 2002/0184439 A1* | 12/2002 | Hino et al. | 711/112 |
| 2003/0046270 A1* | 3/2003 | Leung et al. | 707/1 |
| 2003/0135609 A1* | 7/2003 | Carlson et al. | 709/224 |
| 2003/0195903 A1* | 10/2003 | Manley et al. | 707/201 |
| 2004/0054697 A1* | 3/2004 | Tsaur et al. | 707/204 |
| 2004/0073747 A1* | 4/2004 | Lu | 711/114 |
| 2004/0193791 A1* | 9/2004 | Felton et al. | 711/112 |

FOREIGN PATENT DOCUMENTS

| | | |
|---|---|---|
| WO | WO 02/27462 | 4/2002 |
| WO | WO 02/069159 | 9/2002 |

OTHER PUBLICATIONS

Authorized Officer Marja Brouwers, *The International Search Report and the Written Opinion of the International Searching Authority*, International Searching Authority, Apr. 18, 2005, 12 pages.
*The Case for Storage Virtualization Using Intelligent Routers*, Crossroads Systems, Inc., XP-002200766, 2001, 13 pages.
De Ceulaer, B., Primary Examiner for the Examining Division, European Patent Office, "Communication Pursuant to Article 96(2) EPC," 4 pages, Jun. 20, 2006.

* cited by examiner

*Primary Examiner*—Phuoc H. Nguyen
(74) *Attorney, Agent, or Firm*—Bromberg & Sunstein LLP

(57) ABSTRACT

A network-attached system, device, and method supports storage devices having a plurality of storage device types, such as Fibre Channel storage devices, ATA storage devices, serial attached SCSI storage devices, serial ATA storage devices, and solid stage storage devices. Each storage device having a different storage device type is associated with a set of management rules. The management rules may includes rules for such things as identifying the dedicated storage device, configuring the dedicated storage device, sending disk protocol messages to the dedicated storage device, handling disk protocol message received from the dedicated storage device, and handling error and exception conditions.

26 Claims, 10 Drawing Sheets

NETWORK-ATTACHED STORAGE SYSTEM, DEVICE, AND METHOD SUPPORTING MULTIPLE STORAGE DEVICE TYPES

TECHNICAL FIELD

The present invention relates to data storage systems, and in particular to network-attached storage systems that support multiple storage device types simultaneously.

BACKGROUND

In today's information age, computer and communication systems often require large amounts of data storage. More and more frequently, access to data storage is being provided over communication networks. Among other things, this makes data storage resources available to a number of data storage users.

FIG. 1 shows a conceptual view of a storage system 106 that is accessed by a number of users 102 over a communication network 104, such as an Ethernet local area network (LAN), as is known in the art. The users 102 represent various entities that access storage services provided by the storage system 106 over the communication network 104. The users 102 can be inside or outside of the storage system 106 (for example, as will be discussed below, a server within the storage system 106 may provide storage services as well as access storage services over the communication network 104).

There are generally two types of network-based data storage technologies that are used in the storage system 106, namely Storage Area Network (SAN) and Network-attached Storage (NAS). SAN is traditionally defined as the provision of raw block data using a Fibre Channel (FC) network. NAS typically provides file services over the LAN 104.

FIG. 2 shows a SAN-based storage system as is known in the art. The SAN-based storage system includes a number of storage devices 210 in communication with a number of servers 206 over a FC network 208. The FC network 208 and the storage devices 210 represent a SAN, and the servers 206 are essentially users of the SAN. Each of the servers 206 typically supports a particular application. For example, there may be separate servers for email and World Wide Web applications. The storage resources provided by the storage devices 210 are typically partitioned, and a separate portion of the storage resources is allotted to each server 206 for a particular application. Each of the servers 206 is only permitted to access that portion of the storage resources it is allotted. Each of the servers 206 is coupled to the LAN 104. Among other things, the LAN 104 allows for inter-server communication (for example, to allow for file sharing between different applications and for copying data from one application to another) and also for access to the servers 206 by the users 102.

FIG. 3 shows an exemplary NAS-based storage system as is known in the art. The NAS-based storage system includes a NAS server 306 in communication with a number of dedicated storage devices 310, for example, over a FC network 308. The NAS server 306 manages and controls the dedicated storage devices 310 so as to allow multiple applications to share the storage resources at a file level, rather than dedicating portions of the storage resources to specific applications, as in a SAN. Thus, the NAS server 306 provides multi-user access to storage resources at a file level and also provides for capacity sharing by making all storage resources available to all applications if needed or desired.

The NAS server 306 is coupled to the LAN 104. Among other things, the LAN 104 allows for access to the NAS server 306 by the users 102.

SAN and NAS are not mutually exclusive technologies. For example, as shown in FIG. 3, the FC network 308 and the dedicated storage devices 310 are essentially a SAN that is managed and controlled by the NAS server 306. Also, as shown in FIG. 4, the storage system 106 may include both SAN and NAS technologies, with the servers 206 and the NAS server 306 coupled to the LAN 104.

One problem with the SAN-based storage system, as discussed with reference to FIG. 2 above, is that inter-server data transfers (such as file sharing between different applications and copying data from one application to another) are made over the LAN 104. This can have a serious impact on overall system performance, both by increasing the traffic load on the LAN 104 and by increasing to the processing load on the servers 206. In a NAS-based storage system, such file sharing and data copying can be accomplished by the NAS server 306 without using the LAN 104, so such operations have little or no impact on overall system performance.

SUMMARY OF THE INVENTION

A network-attached system, device, and method supports storage devices having a plurality of storage device types, such as Fibre Channel storage devices, ATA storage devices, serial attached SCSI storage devices, serial ATA storage devices, and solid stage storage devices. Each storage device having a different storage device type is associated with a set of management rules. The management rules may includes rules for such things as identifying the dedicated storage device, configuring the dedicated storage device, sending disk protocol messages to the dedicated storage device, handling disk protocol message received from the dedicated storage device, and handling error and exception conditions.

In one embodiment of the invention there is provided a network-attached storage system including a network-attached storage server providing storage services over a communication network and a plurality of dedicated storage devices in communication with the network-attached storage server using a disk control protocol. The plurality of dedicated storage devices are of a plurality of storage device types. Each dedicated storage device of a different storage device type has a different set of management rules. The network-attached storage server manages each dedicated storage device using the set of management rules for that dedicated storage device and storage device type. The network-attached storage server typically permits data transfers between dedicated storage devices having different storage device types. The dedicated storage devices may include RAID functionality or else the network-attached storage server may provide RAID functionality for the dedicated storage devices. The network-attached storage system may also include a dedicated tape storage device in communication with the network-attached storage server for storing data from any of the dedicated storage devices.

In another embodiment of the invention there is provided a network-attached storage device for providing storage services over a communication network. The network-attached storage server includes at least one storage interface for communicating with a plurality of dedicated storage devices using a disk control protocol, the plurality of dedicated storage devices being of a plurality of storage device types, each dedicated storage device of a different storage device type having a different set of management rules. The network-attached storage server also includes storage logic for storing data on the plurality of dedicated storage devices, the storage logic comprising disk control logic for managing the plurality of dedicated storage devices through the at least one storage interface, the disk control logic managing each dedicated storage device using the set of management rules for that dedicated storage device and storage device type. The storage logic typically includes data transfer logic for performing data transfers between dedicated storage devices having different storage device types. The data transfer logic typically comprises a hardware component implementing a network data management protocol. The storage logic may include RAID logic providing RAID (Redundant Array of Independent Disk) functionality for the dedicated storage devices. The storage logic may include tape control logic for managing a tape storage device through the at least one storage interface using a tape control protocol. The disk control logic typically includes a hardware component implementing a Fibre Channel communication protocol for communicating with the dedicated storage devices and further implementing the disk control protocol for exchanging disk control protocol message with each of the dedicated storage devices and software component including a programmable processor suitably programmed for managing each dedicated storage device using the set of management rules for that dedicated storage device and storage device type.

In yet another embodiment of the invention there is provided a method for supporting storage devices having different storage device types by a network storage server in a network-attached storage system. The method involves maintaining a set of management rules for each of a plurality of dedicated storage devices that are in communication with the network storage server using a disk control protocol, the plurality of dedicated storage devices being of a plurality of storage device types, each dedicated storage device of a different storage device type having a different set of management rules, and managing each dedicated storage device using the set of management rules for that dedicated storage device and storage device type. Managing each dedicated storage device using the set of management rules for that dedicated storage device and storage device type may involve receiving an indication that a new dedicated storage device is present and using the sets of management rules for the various dedicated storage devices and storage device types to identify the new dedicated storage device. Each dedicated storage device having a different storage device type may be configured differently, in which case managing each dedicated storage device using the set of management rules for that dedicated storage device and storage device type may involve configuring each different dedicated storage device according to the set of management rules for the dedicated storage device and storage device type. Managing each dedicated storage device using the set of management rules for that dedicated storage device and storage device type may involve sending disk control protocol messages to the dedicated storage devices, at least some of the disk control protocol messages formatted differently for different dedicated storage devices according to the set of management rules for each dedicated storage device and storage device type. Each dedicated storage device having a different storage device type may have a maximum queue size, in which case managing each dedicated storage device using the set of management rules for that dedicated storage device and storage device type may involve determining a number of disk control protocol messages that can be queued to each dedicated storage device according to the set of management rules for each dedicated storage device and storage device type. Each dedicated storage device having a different storage device type may have a preferred stripe size, in which case managing each different dedicated storage device using the set of management rules for that dedicated storage device and storage device type may involve writing data to each dedicated storage device using the preferred stripe size for the dedicated storage device according to the set of management rules for each dedicated storage device and storage device type. Managing each dedicated storage device using the set of management rules for that dedicated storage device and storage device type may involve receiving disk control protocol messages from the dedicated storage devices and processing the disk control protocol messages from different dedicated storage devices according to the set of management rules for each dedicated storage device and storage device type. Each dedicated storage device having a different storage device type may have different error and exception handling rules, in which case managing each dedicated storage device using the set of management rules for that dedicated storage device and storage device type may involve handling errors and exceptions for different dedicated storage devices according to the set of management rules for each dedicated storage device and storage device type.

In still another embodiment of the invention there is provided a network-attached storage server comprising means for concurrently supporting a plurality of dedicated storage devices in communication with the network-attached storage server using a disk control protocol, the plurality of storage devices being of a plurality of storage device types and means for managing the plurality of storage devices to provide storage services to a number of users over a communication network.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
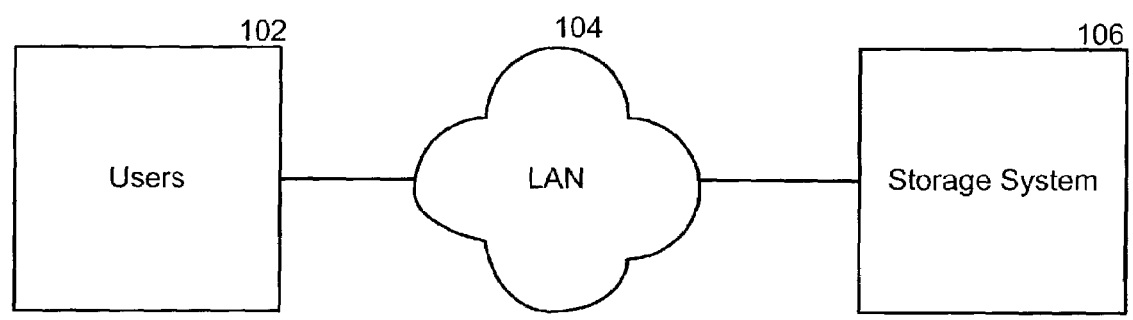
FIG. 1 shows a conceptual view of a storage system that is accessed by a number of users over a communication network, such as an Ethernet local area network (LAN), as is known in the art.
Figure 2:
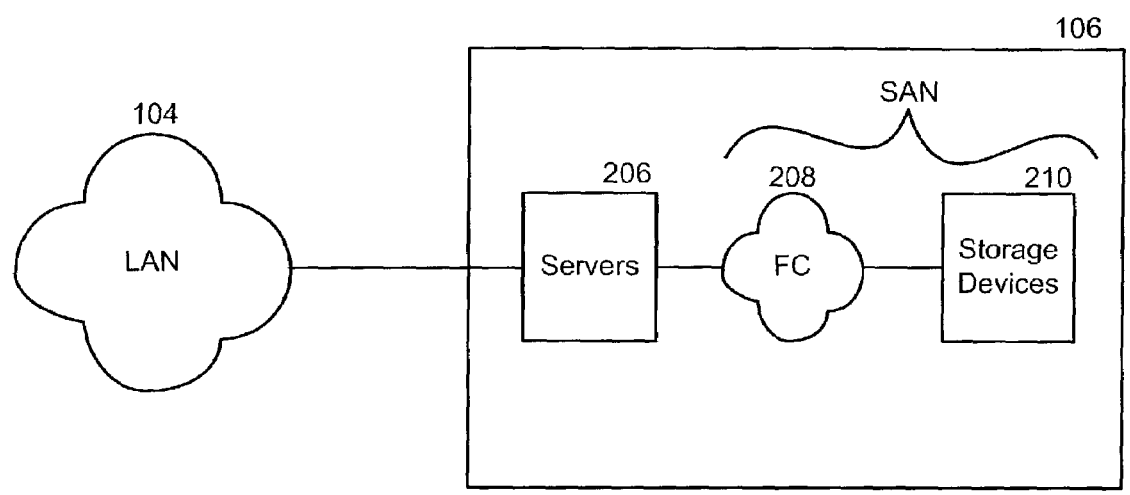
FIG. 2 shows a SAN-based storage system as is known in the art.
Figure 3:
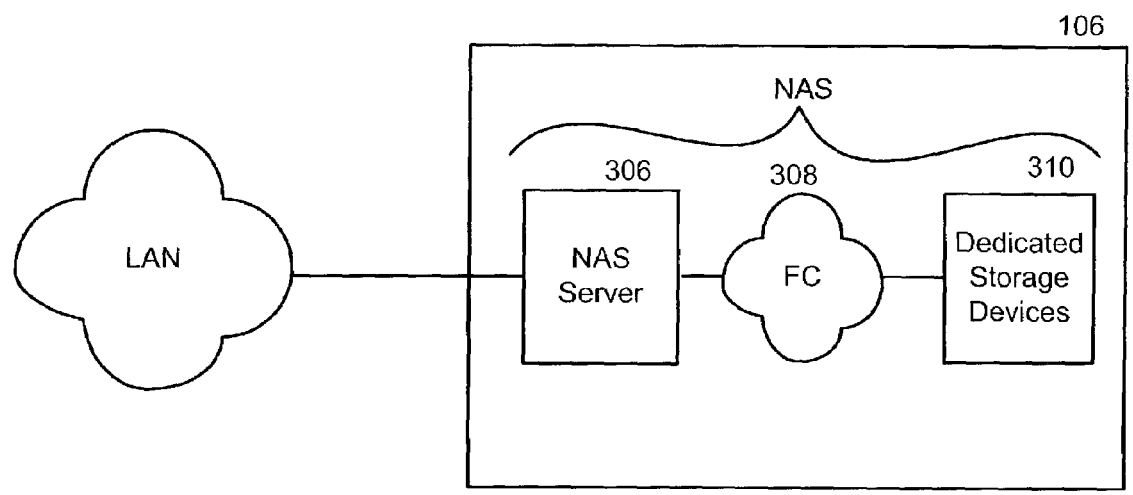
FIG. 3 shows a NAS-based storage system as is known in the art.
Figure 4:
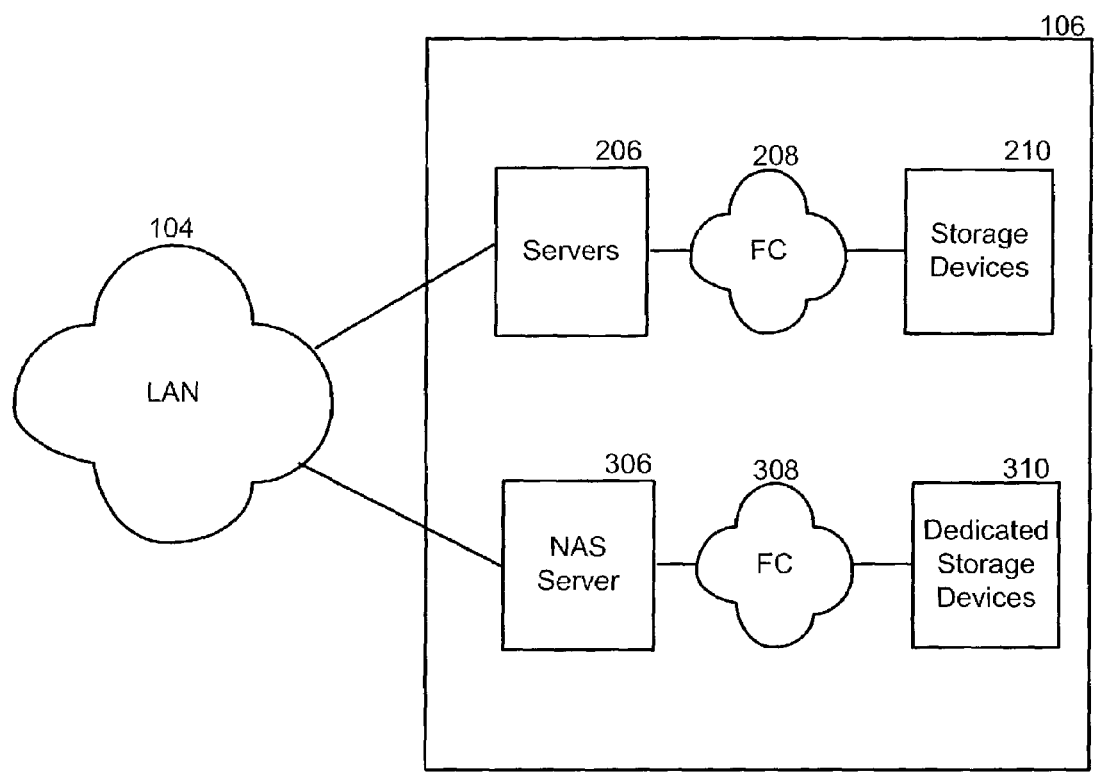
FIG. 4 shows a storage system 106 including both SAN and NAS technologies.

The present invention relates to NAS-based storage systems, and, more specifically, to NAS-based storage systems that simultaneously support storage devices that are controlled using a disk control protocol (typically a SCSI disk control protocol) and have different storage device types. For purposes of this discussion and the appended claims, the term "storage device type" is meant to refer to the underlying storage technologies of the storage devices. Examples of storage device types include Fibre Channel (FC), ATA (formerly known as IDE), Serial Attached SCSI (SAS), Serial ATA (SATA), and various types of solid state storage. The term "storage device type" is not meant to refer to other storage device characteristics, such as, for example, the rotational speed of a disk of the storage device, the storage capacity of the storage device, the access time for the storage device, the type of communication interface to the storage device, and whether or not the storage device includes a RAID controller, to name but a few. Thus, for example, different classes of FC storage devices having disk rotation speeds of 15,000 RPM and 10,000 RPM and different storage capacities are considered to be of the FC storage device type, and different classes of ATA storage devices having disk rotation speeds of 7200 RPM and 5400 RPM and different storage capacities are considered to be of the ATA storage device type. Also, for example, an ATA storage device having a Fibre Channel communication interface and a RAID controller is considered to be of the ATA storage device type. Because the storage devices are controlled using a disk control protocol, the present invention does not apply to storage devices that are not controlled using a disk control protocol, such as a tape storage device (which is controlled using a tape control protocol, which may be a SCSI tape control protocol), but does apply to non-disk storage devices that are controlled using a disk control protocol, such as certain solid state storage devices.

A typical NAS-based storage system supports only storage devices having one storage device type at a time. For example, some vendors offer NAS-based storage systems with multiple FC storage devices and some vendors offer NAS-based storage systems with multiple ATA storage devices. NAS-based storage systems utilizing FC storage devices are typically faster and more reliable than NAS-based storage systems utilizing ATA storage devices, while NAS-based storage systems utilizing ATA storage devices are typically less expensive and provide more storage capacity than NAS-based storage systems utilizing FC storage devices. Thus, different types of NAS-based storage systems are typically targeted for different applications. For example, NAS-based storage systems with FC storage devices are typically targeted for enterprise systems where speed and reliability are critical, whereas NAS-based storage systems with ATA storage devices are typically targeted for applications that benefit from large amounts of cheap storage (such as archiving in lieu of tape).

Figure 5:
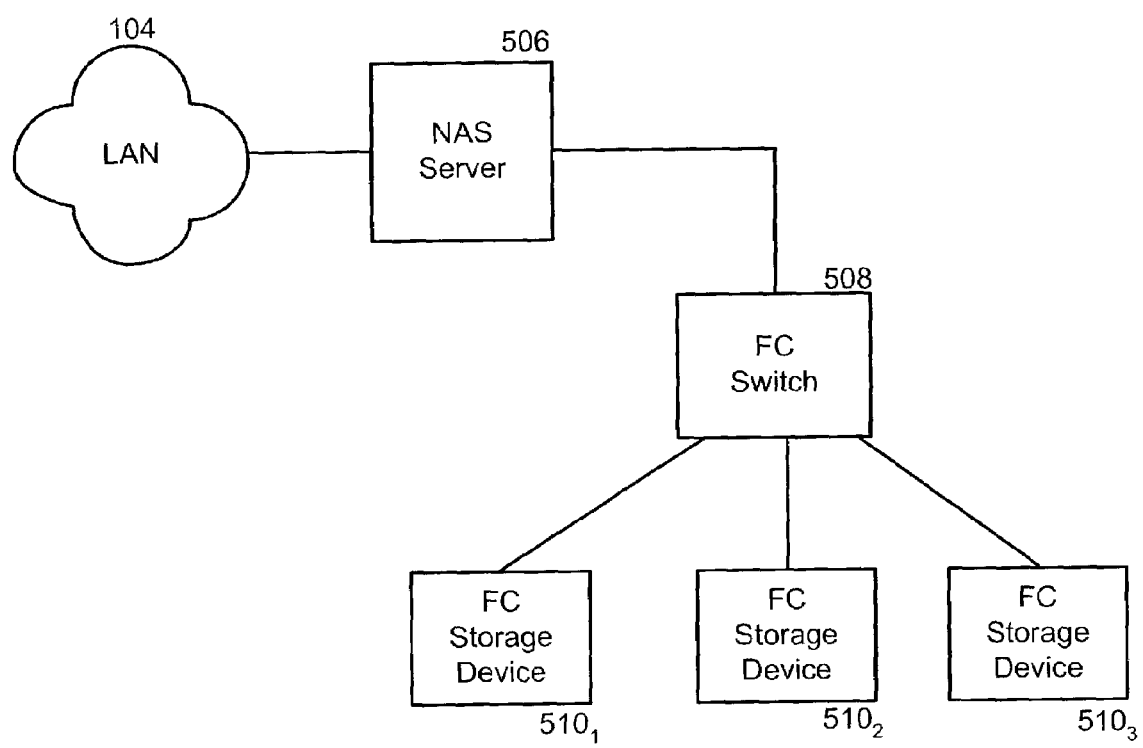
FIG. 5 shows an exemplary NAS-based storage system utilizing Fibre Channel storage devices as known in the art.

FIG. 5 shows an exemplary NAS-based storage system utilizing FC storage devices. Specifically, the NAS server 506 is coupled to FC storage devices $510_1$, $510_2$, and $510_3$ (referred to hereinafter individually as a FC storage device 510 and collectively as FC storage devices 510) through a FC switch 508. The FC storage devices 510 may include different classes of FC devices. The FC storage devices 510 may include RAID controllers. If the FC storage devices 510 do not include RAID controllers, then the NAS server 506 would typically provide RAID functionality for the FC storage devices 510.

Figure 6:
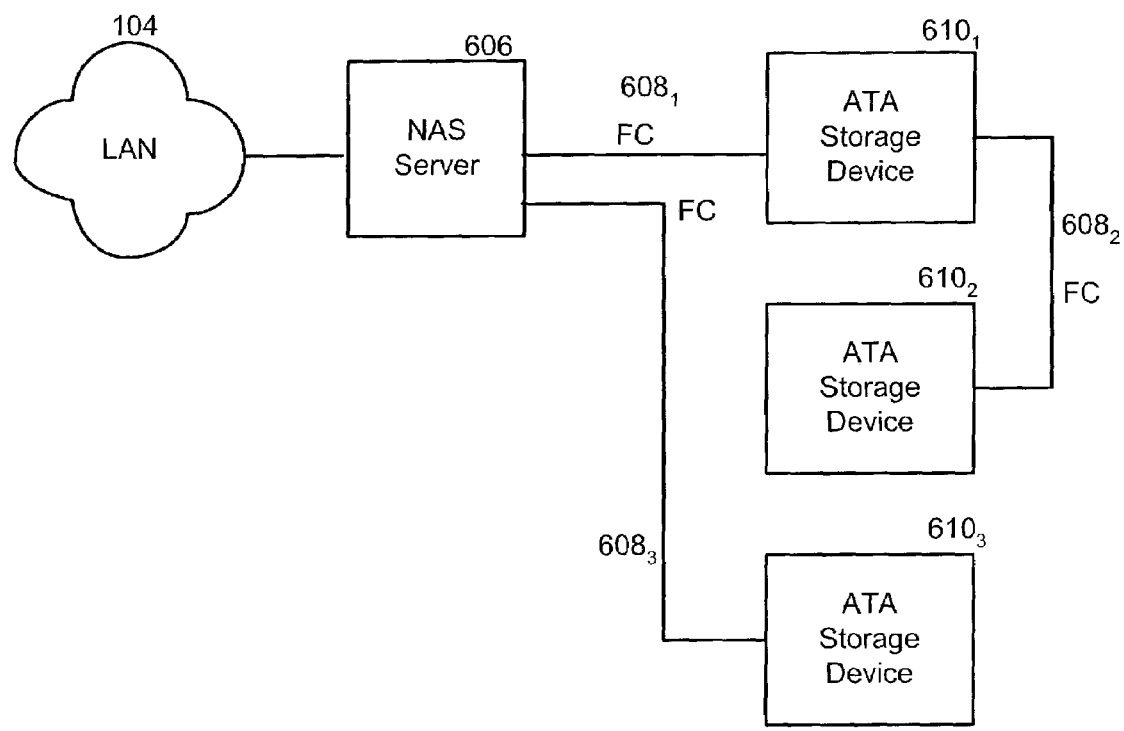
FIG. 6 shows an exemplary NAS-based storage system utilizing ATA storage devices as known in the art.

FIG. 6 shows an exemplary NAS-based storage system utilizing ATA storage devices. Specifically, the NAS server 606 is coupled to ATA storage devices $610_1$, $610_2$, and $610_3$ (referred to hereinafter individually as a ATA storage device 610 and collectively as ATA storage devices 610) through FC links $608_1$, $608_2$, and $608_3$. The ATA storage devices 610 may include different classes of ATA devices. The ATA storage devices 610 may include RAID controllers. If the ATA storage devices 610 to not include RAID controllers, then the NAS server 606 would typically provide RAID functionality for the ATA storage devices 610.

In various embodiments of the present invention, a NAS-based storage system simultaneously supports storage devices having multiple storage device types. Because the different storage device types have different characteristics (for example, performance, capacity, cost), the ability to simultaneously support storage devices having multiple storage device types permits the NAS-based storage system to provide different levels or tiers of storage. Different types of storage devices can be added or removed from the NAS-based storage system, for example, to allow storage needs to be matched with performance, capacity, and budget (cost) requirements, while maintaining scalability, flexibility, and manageability of the complete storage solution. Thus, among other things, multi-tiered storage allows for scalable and flexible storage solutions that offer high levels of performance with simplified and consolidated storage management. Using various tiers of storage, data can be kept on-line for longer periods of time without backing up data to tape, reducing the need to restore data from tape when the data is required. This also tends to decrease the backup window required, as data can be backed up onto storage devices that have higher capacity and higher performance than tapes. Thus, with multi-tiered storage, data remains on the storage devices longer and therefore is more readily available for user access.

Within the multi-tiered NAS-based storage system, data can be stored in any of the storage devices, and data can be migrated from any-to-any tier of storage using various data migration methods, such as snapshots, bulk data move/copy, and policy-based methods. For example, using snapshots, a snapshot of a volume can be taken and then the changes migrated to a lower-performing tier of storage. Using bulk data move/copy, data can be moved en mass from one tier to another. Policy-based migration can be implemented on the system where data that is older than a defined time period is migrated from tier-to-tier of storage. The migration of data does not have to be from a higher performing tier to a lower performing tier. Rather, the movement of data can be bi-directional going from a higher performing tier to a lower performing tier or from a lower performing tier to a higher performing tier. Multi-tiered storage enables more expensive storage to be freed up and less costly storage to be used for applications that are not frequently accessed or that do not require high performance, while maintaining an integrated and central management of the complete storage solution.

Data migration can be intra-server (i.e., among the dedicated storage of a NAS server) or inter-server (i.e., between two NAS servers). Thus, data can be migrated to one or more volumes on the same NAS server, or data can be migrated to another NAS server located in the same data center or at a remote location for backup and/or disaster recovery purposes. Using any of the above-mentioned options, the migrated data is read/writable.

In a typical embodiment of the present invention, all of the storage devices have the same type of communication interface (typically Fibre Channel), and either all or none of the storage devices include RAID controllers. In embodiments of the present invention in which the storage devices do not include RAID controllers and the NAS server provides RAID functionality for the storage devices, connecting additional storage devices typically increases the processing load on the NAS server. Thus, it is preferable for the storage devices to include the RAID controllers.

Figure 7:
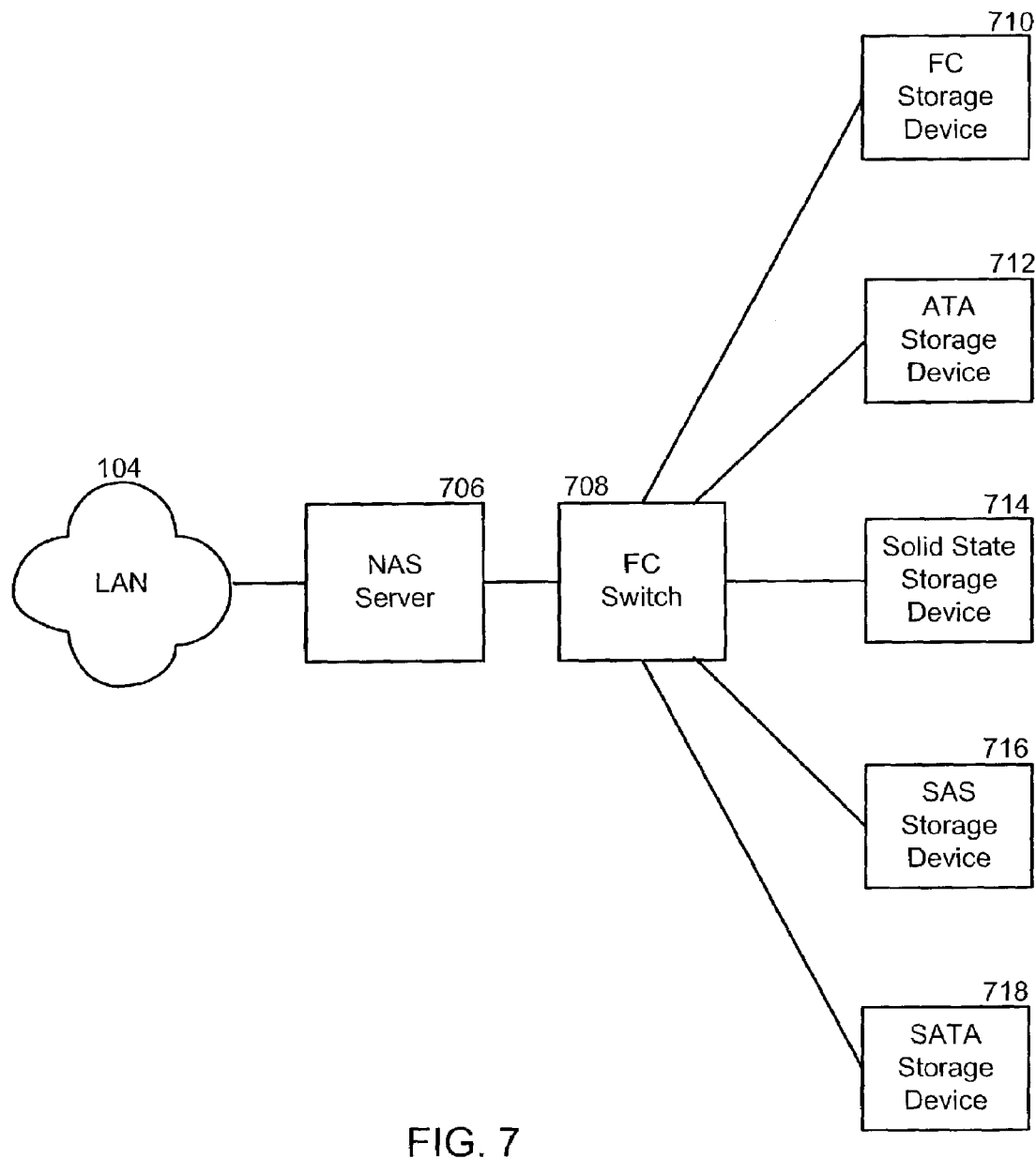
FIG. 7 shows an exemplary embodiment of the present invention in which an NAS server simultaneously supports storage devices having multiple storage device types.

FIG. 7 shows an exemplary embodiment of the present invention in which an NAS server 706 simultaneously supports storage devices having multiple storage device types, including FC storage devices 710, ATA storage devices 712, solid state storage devices 714, and, in the future, SAS storage devices 716 and SATA storage devices 718 (as of this writing, SAS and SATA storage devices are not commercially available, although it will be apparent to a skilled artisan from the teachings of this specification how such devices can be supported by the NAS server 706 and integrated into the multi-tiered NAS-based storage system). In this example, all storage devices have a Fibre Channel communication interface, and the NAS server 706 communicates with the storage devices through a FC switch 708.

In one specific embodiment of the present invention, the multi-tiered NAS-based storage system supports two classes of FC storage devices, two classes of ATA storage devices, and a tape storage device in order to provide varying levels or tiers of storage.

Figure 8:
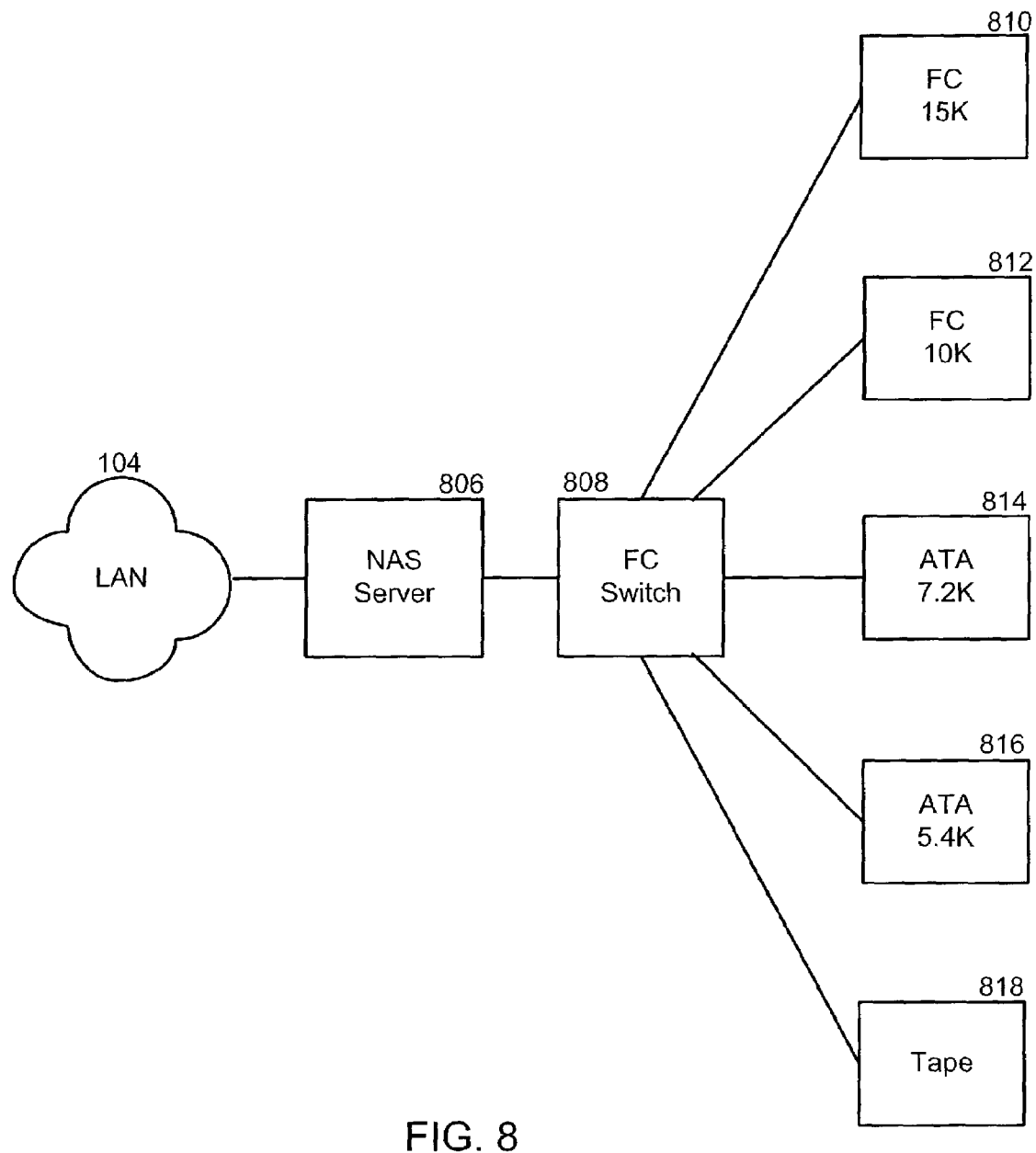
FIG. 8 shows an exemplary embodiment of the present invention in which an NAS server simultaneously supports two classes of FC storage devices, two classes of ATA storage devices, and tape storage devices in order to provide varying levels or tiers of storage.

FIG. 8 shows an exemplary embodiment of the present invention in which an NAS server 806 simultaneously supports two classes of FC storage devices, two classes of ATA storage devices, and tape storage devices in order to provide varying levels or tiers of storage. Specifically, the NAS server 806 supports FC storage devices 810 operating at 15,000 RPM, FC storage devices 812 operating at 10,000 RPM, ATA storage devices 814 cooperating at 7200 RPM, ATA storage devices 816 operating at 5400 RPM, and tape storage devices 818. The 15,000 RPM FC storage devices 810 provide very high performance storage. The 10,000 RPM FC storage devices 812 provide high performance storage. The 7200 RPM ATA storage devices 814 provide moderate performance storage. The 5400 RPM ATA storage devices 816 provide low performance storage, and are suitable for archival applications. The tape storage devices 818 are suitable for long term tape backup storage. In this example, all storage devices have a Fibre Channel communication interface, and the NAS server 806 communicates with the storage devices through a FC switch 808.

In order to integrate storage devices having multiple storage device types into a NAS-based storage system, it is not sufficient to simply connect storage devices that have compatible communication interfaces (typically Fibre Channel) and use a particular disk control protocol (typically SCSI) and expect that they will work reliably (or even at all) within the NAS-based storage system.

One reason why storage devices having different storage device types may not work reliably (or even at all) within the NAS-based storage system is that, even though the format of disk control messages is generally well-defined for a particular disk control protocol, different storage devices typically implement the disk control protocol differently. This can be true even for different storage devices from the same vendor (for example, a FC storage device from a particular vendor might implement the disk control protocol differently than an ATA storage device from that vendor). These different implementations can affect such things as how a particular storage device is identified, configured, and managed, how the storage device handles error or exception conditions, the types and content of messages sent to the NAS server by the storage device, and how the storage device responds to messages sent by the NAS server. For example, one storage device might use serial number to identify itself, while another storage device might use a world wide name to identify itself. Also, certain disk control messages permit vendor-specific information to be carried, and certain implementations might use a "standard" disk control message in a non-standard way. Furthermore, the various storage devices tend to handle error or exception conditions quite differently.

Another reason why storage devices having different storage device types may not work properly within the NAS-based storage system is that storage devices having different storage device types typically have different operating parameters. For example, storage devices having different storage device types can differ in such things as the number of commands that can be queued (e.g., high-end FC storage devices are typically capable of queuing more commands than, say, low-end ATA devices), the "stripe" size (a well-known concept of multiple disk storage systems for simultaneously writing data to multiple disks), the preferred write size (i.e., the preferred number of data blocks to be written to the storage device in each write operation), and the way in which flow control is handled, to name but a few.

Thus, in order to integrate storage devices having multiple storage device types into a NAS-based storage system, it is necessary for the NAS server to interact differently with the different storage devices, and specifically with storage devices having different storage device types. Thus, the NAS server typically includes storage logic for storing data on the plurality of storage devices. The storage logic includes disk control logic that manages the storage devices. The disk control logic includes management rules defining how each different storage device and storage device type is managed. The management rules generally determine how the NAS server identifies, configures, and otherwise interacts with a particular storage device. In one embodiment of the present invention, the disk control logic is implemented with both hardware and software components. The hardware component implements a Fibre Channel communication protocol for communicating with the dedicated storage devices and further implements the disk control protocol for exchanging disk control protocol message with each of the storage devices, while the software component manages each dedicated storage device using the set of management rules for that dedicated storage device and storage device type. In actuality, the hardware component applies various management rules relating to data handling through configurable parameters programmed by the software component, such as the number of commands that can be queued, the "stripe" size, and the preferred write size. The software component applies other management rules itself, such as storage device identification, configuration, and management rules, including error and exception rules.

Figure 9:
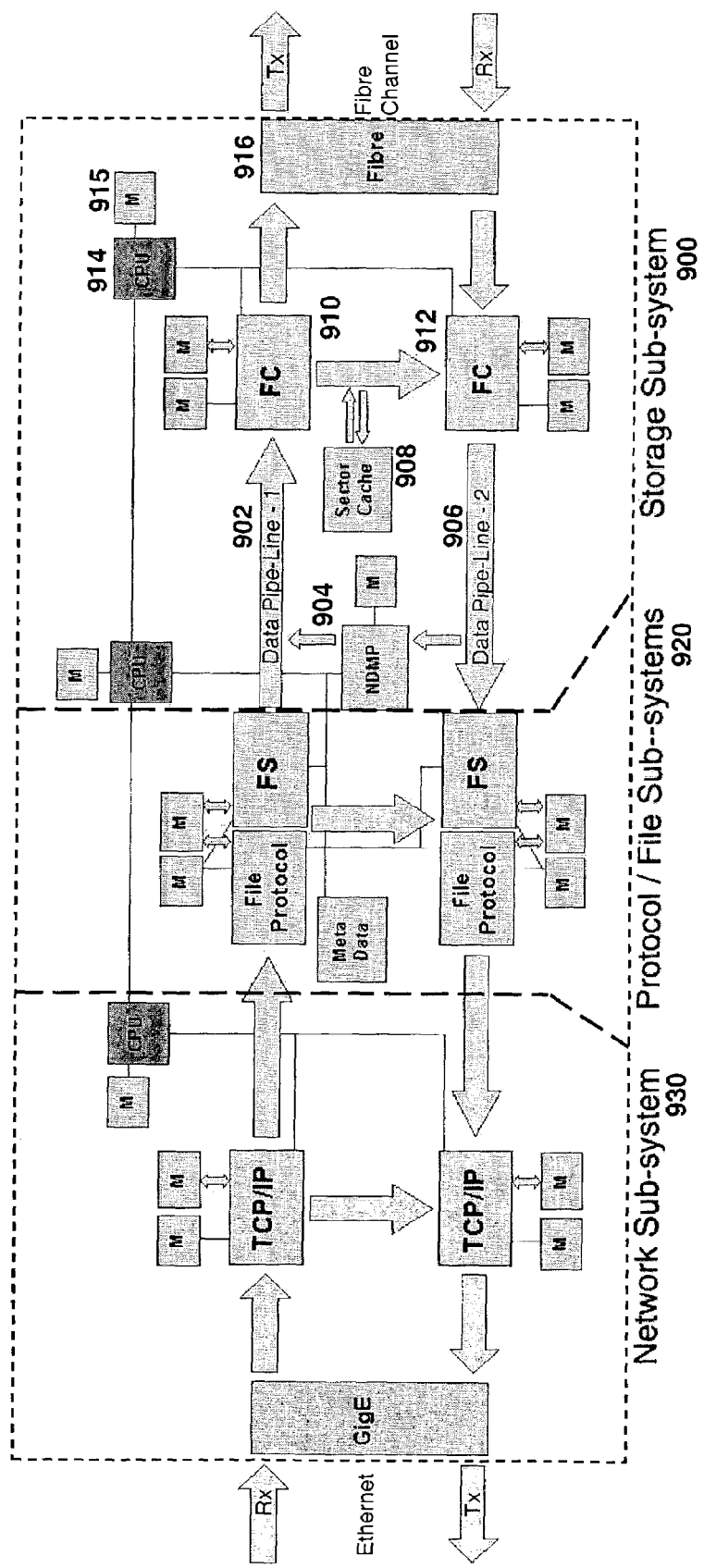
FIG. 9 is a schematic block diagram showing the architecture of a NAS server in accordance with a specific embodiment of the present invention.

FIG. 9 is a schematic block diagram showing the architecture of a NAS server in accordance with a specific embodiment of the present invention. The architecture is divided into three major blocks, namely a network sub-system 930, protocol/file sub-systems 920, and a storage sub-system 900, logically delineated substantially as shown.

Predominantly all of the critical components in the data path are implemented in hardware (typically in Field Programmable Gate Arrays). The storage logic discussed above resides substantially in the storage sub-system 900. The network sub-system 930 and the protocol/file sub-systems 920 are shown for convenience, but are essentially outside the scope of the present invention, and so will not be described further.

Among other things, the storage sub-system 900 includes a first data pipe-line 902 for data traveling from the protocol/file sub-systems to the storage sub-system and a second data pipe-line 906 for data traveling from the storage sub-system to the protocol/file sub-systems. An NDMP hardware block 904 situated between the first data pipe-line 902 and the second data pipe-line 906 implements the Network Data Management Protocol (NDMP) for, among other things, performing intra-server data transfers between storage devices having different storage device types. The disk control logic is represented by FC blocks 910 and 912 and CPU 914, wherein the FC blocks 910 and 912 are the hardware components (typically implemented in a single FPGA) and the CPU 914 represents the software components. The hardware component encompassing FC blocks 910 and 912 implements the Fibre Channel communication protocol for communicating with the various storage devices through the Fibre Channel (Fibre) network interface 916, implements the disk control protocol for exchanging disk control protocol messages with the storage devices, and manages the sector cache 908, among other things. The software component maintains a set of management rules for each different storage device and storage device type in the memory 915. The software component configures the hardware component to apply various data handling rules (such as the number of commands that can be queued, the "stripe" size, and the preferred write size), and applies other rules itself (such as storage device identification, configuration, and management rules, including error and exception rules), among other things.

When a new storage device is attached to the Fibre Channel network, the software component generally receives an interrupt or other notification from the hardware component that a new device is present. The software component attempts to identify the new storage device, using the management rules for the various storage devices and storage device types. Assuming the software component is able to identify the new storage device, the software component performs any steps necessary to activate and utilize the new storage device. This typically involves obtaining certain information from the new storage device, configuring the new storage device, and configuring the hardware component to support the new storage device, among other things. The software component is then able to mount the new storage device and begin using the new storage device for storage.

In order to perform an intra-server data migration from one storage device to another storage device, data is read from the one storage device through the Fibre network interface 916 and passes through the FC block 912 and into the second data pipe-line 906. The NDMP hardware 904 picks up the data from the second data pipe-line 906 and places the data on the first data pipe-line 902. The data then passes through the FC block 910 and through the Fibre network interface 916 to the other storage device. This operation is handled completely in hardware and without the data passing through to the LAN or even through to the protocol/file sub-systems 920.

Figure 10:
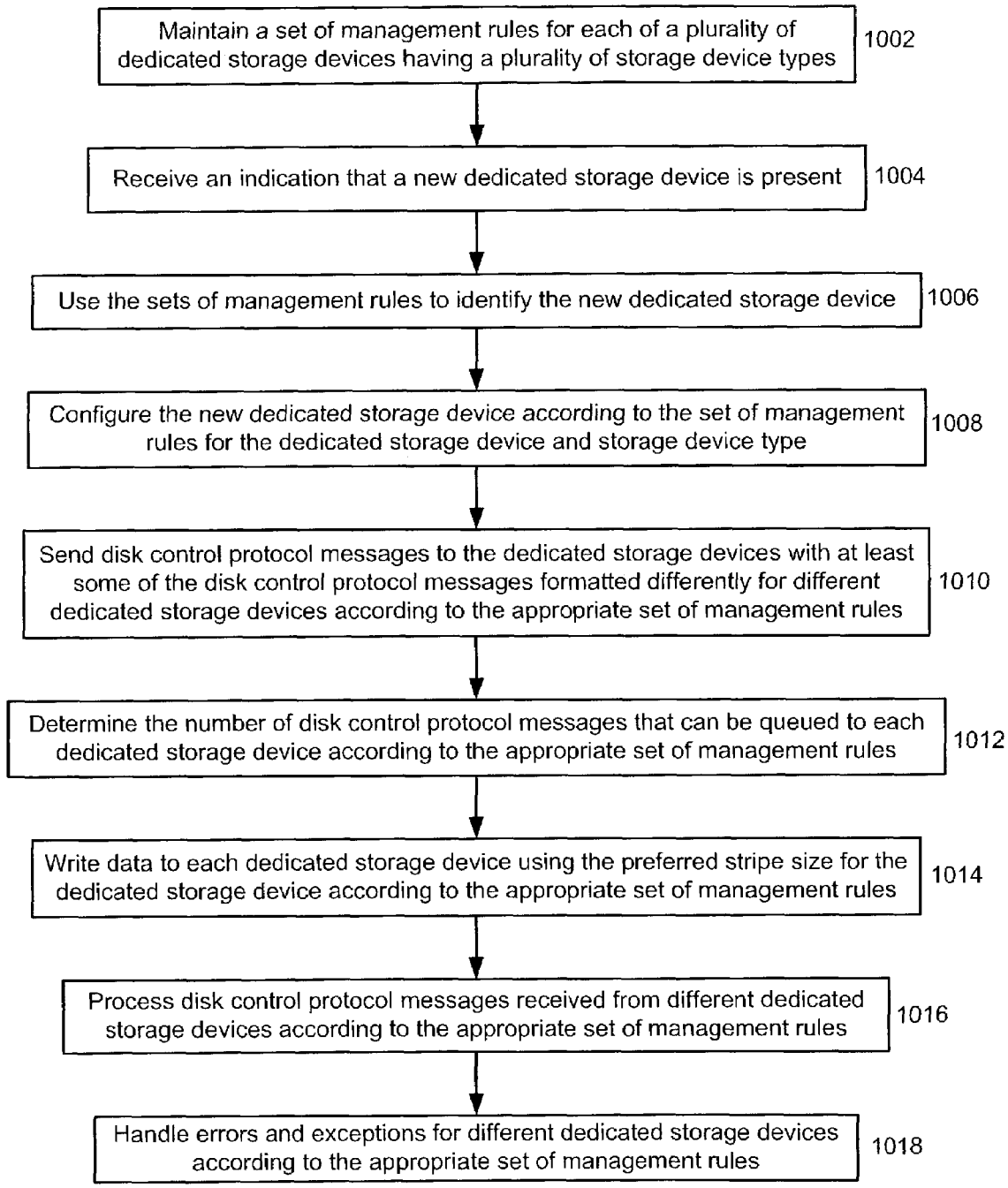
FIG. 10 is a logic flow diagram showing exemplary disk control logic for supporting storage devices having different storage device types in accordance with an embodiment of the present invention.

FIG. 10 is a logic flow diagram showing exemplary disk control logic for supporting storage devices having different storage device types in accordance with an embodiment of the present invention. In block 1002, the disk control logic maintains a set of management rules for each of a plurality of dedicated storage devices having a plurality of storage device types. Upon receiving an indication that a new dedicated storage device is present, in block 1004, the disk control logic uses the sets of management rules to identify the new dedicated storage device, in block 1006, and then may configure the new dedicated storage device according to the set of management rules for the dedicated storage device and storage device type, in block 1008. Thereafter, the disk control logic may send disk control protocol messages to the dedicated storage devices with at least some of the disk control protocol messages formatted differently for different dedicated storage devices according to the appropriate set of management rules, in block 1010. The disk control logic may also determine the number of disk control protocol messages that can be queued to each dedicated storage device according to the appropriate set of management rules, in block 1012. The disk control logic may also write data to each dedicated storage device using the preferred stripe size for the dedicated storage device according to the appropriate set of management rules, in block 1014. The disk control logic may process disk control protocol messages received from different dedicated storage devices according to the appropriate set of management rules, in block 1016. The disk control logic may handle errors and exceptions for different dedicated storage devices according to the appropriate set of management rules, in block 1018. The disk control logic may use the various management rules for other management purposes as required for a particular storage device, storage device type, or storage application.

It should also be noted that the above logic flow diagram is used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for supporting storage devices having different storage device types by a network storage server in a network-attached storage system, the method comprising:
    maintaining a set of management rules for each of a plurality of dedicated storage devices that are in communication with the network storage server using a disk control protocol, the plurality of dedicated storage devices being of a plurality of storage device types, each dedicated storage device of a different storage device type having a different set of management rules; and
    managing each dedicated storage device using the set of management rules for that dedicated storage device and storage device type wherein such managing includes sending disk control protocol messages to the dedicated storage devices at least some of the disk control protocol messages formatted differently for different dedicated storage devices according to the set of management rules for each dedicated storage device and storage device type.

2. The method of claim 1, wherein the plurality of storage device types includes a plurality of
    a Fibre Channel storage device type;
    an ATA storage device type;
    a serial attached SCSI storage device type;
    a serial ATA storage device type; and
    a solid state storage device type.

3. The method of claim 1, wherein the plurality of dedicated storage devices include:
    at least one Fibre Channel storage device; and
    at least one ATA storage device.

4. The method of claim 1, wherein managing each dedicated storage device using the set of management rules for that dedicated storage device and storage device type further comprises:
    receiving an indication that a new dedicated storage device is present; and
    using the sets of management rules for the various dedicated storage devices and storage device types to identify the new dedicated storage device.

5. The method of claim 1, wherein each dedicated storage device having a different storage device type is configured differently, and wherein managing each dedicated storage device using the set of management rules for that dedicated storage device and storage device type further comprises:
    configuring each different dedicated storage device according to the set of management rules for the dedicated storage device and storage device type.

6. The method of claim 1, wherein each dedicated storage device having a different storage device type has a maximum queue size, and wherein managing each dedicated storage device using the set of management rules for that dedicated storage device and storage device type further comprises:
    determining a number of disk control protocol messages that can be queued to each dedicated storage device according to the set of management rules for each dedicated storage device and storage device type.

7. The method of claim 1, wherein each dedicated storage device having a different storage device type has a preferred stripe size, and wherein managing each different dedicated storage device using the set of management rules for that dedicated storage device and storage device type further comprises:
    writing data to each dedicated storage device using the preferred stripe size for the dedicated storage device according to the set of management rules for each dedicated storage device and storage device type.

8. The method of claim 1, wherein managing each dedicated storage device using the set of management rules for that dedicated storage device and storage device type further comprises:

receiving disk control protocol messages from the dedicated storage devices; and processing the disk control protocol messages from different dedicated storage devices according to the set of management rules for each dedicated storage device and storage device type.

9. The method of claim 1, wherein each dedicated storage device having a different storage device type has different error and exception handling rules, and wherein managing each dedicated storage device using the set of management rules for that dedicated storage device and storage device type further comprises:

handling errors and exceptions for different dedicated storage devices according to the set of management rules for each dedicated storage device and storage device type.

10. A method for supporting storage devices having different storage device types by a network storage server in a network-attached storage system, the method comprising:

maintaining a set of management rules for each of a plurality of dedicated storage devices that are in communication with the network storage server using a disk control protocol, the plurality of dedicated storage devices being of a plurality of storage device types, each dedicated storage device of a different storage device type having a different set of management rules, each dedicated storage device of a different storage device type also having a maximum queue size; and managing each dedicated storage device using the set of management rules for that dedicated storage device and storage device type, wherein such managing includes determining a number of disk control protocol messages that can be queued to each dedicated storage device according to the set of management rules for each dedicated storage device and storage device type.

11. The method of claim 10, wherein the plurality of storage device types includes a plurality of:

a Fibre Channel storage device type;
an ATA storage device type;
a serial attached SCSI storage device type;
a serial ATA storage device type; and
a solid state storage device type.

12. The method of claim 10, wherein the plurality of dedicated storage devices include:

at least one Fibre Channel storage device; and
at least one ATA storage device.

13. The method of claim 10, wherein managing each dedicated storage device using the set of management rules for that dedicated storage device and storage device type further comprises:

receiving an indication that a new dedicated storage device is present; and using the sets of management rules for the various dedicated storage devices and storage device types to identify the new dedicated storage device.

14. The method of claim 10, wherein each dedicated storage device having a different storage device type is configured differently, and wherein managing each dedicated storage device using the set of management rules for that dedicated storage device and storage device type further comprises:

configuring each different dedicated storage device according to the set of management rules for the dedicated storage device and storage device type.

15. The method of claim 10, wherein managing each dedicated storage device using the set of management rules for that dedicated storage device and storage device type further comprises:

sending disk control protocol messages to the dedicated storage devices, at least some of the disk control protocol messages formatted differently for different dedicated storage devices according to the set of management rules for each dedicated storage device and storage device type.

16. The method of claim 10, wherein each dedicated storage device having a different storage device type has a preferred stripe size, and wherein managing each different dedicated storage device using the set of management rules for that dedicated storage device and storage device type further comprises:

writing data to each dedicated storage device using the preferred stripe size for the dedicated storage device according to the set of management rules for each dedicated storage device and storage device type.

17. The method of claim 10, wherein managing each dedicated storage device using the set of management rules for that dedicated storage device and storage device type further comprises:

receiving disk control protocol messages from the dedicated storage devices; and processing the disk control protocol messages from different dedicated storage devices according to the set of management rules for each dedicated storage device and storage device type.

18. The method of claim 10, wherein each dedicated storage device having a different storage device type has different error and exception handling rules, and wherein managing each dedicated storage device using the set of management rules for that dedicated storage device and storage device type further comprises:

handling errors and exceptions for different dedicated storage devices according to the set of management rules for each dedicated storage device and storage device type.

19. Apparatus for supporting storage devices having different storage device types in a network-attached storage system, the apparatus comprising:

a set of management rules for each of a plurality of dedicated storage devices, the plurality of dedicated storage devices being of a plurality of storage device types, each dedicated storage device of a different storage device type having a different set of management rules; and a disk controller adapted to manage each dedicated storage device using the set of management rules for that dedicated storage device and storage device type, wherein such managing includes sending disk control protocol messages to the dedicated storage devices, at least some of the disk control protocol messages formatted differently for different dedicated storage devices according to the set of management rules for each dedicated storage device and storage device type.

20. Apparatus of claim 19, wherein the plurality of storage device types includes a plurality of:

a Fibre Channel storage device type;
an ATA storage device type;
a serial attached SCSI storage device type;
a serial ATA storage device type; and
a solid state storage device type.

21. Apparatus of claim 19, wherein the plurality of dedicated storage devices include:

at least one Fibre Channel storage device; and
at least one ATA storage device.

22. Apparatus of claim 19, wherein the disk controller is further adapted for at least one of:
   identifying a new dedicated storage device using the sets of management rules for the various dedicated storage devices and storage device types;
   configuring each different dedicated storage device according to the set of management rules for the dedicated storage device and storage device type, wherein each dedicated storage device having a different storage device type is configured differently;
   determining a number of disk control protocol messages that can be queued to each dedicated storage device according to the set of management rules for each dedicated storage device and storage device type, wherein each dedicated storage device having a different storage device type has a maximum queue size;
   writing data to each dedicated storage device using a preferred stripe size for the dedicated storage device according to the set of management rules for each dedicated storage device and storage device type;
   processing disk control protocol messages received from different dedicated storage devices according to the set of management rules for each dedicated storage device and storage device type; and
   handling errors and exceptions for different dedicated storage devices according to the set of management rules for each dedicated storage device and storage device type, wherein each dedicated storage device having a different storage device type has different error and exception handling rules.

23. Apparatus for supporting storage devices having different storage device types in a network-attached storage system, the apparatus comprising:
   a set of management rules for each of a plurality of dedicated storage devices, the plurality of dedicated storage devices being of a plurality of storage device types, each dedicated storage device of a different storage device type having a different set of management rules; and
   a disk controller adapted to manage each dedicated storage device using the set of management rules for that dedicated storage device and storage device type, wherein such managing includes determining a number of disk control protocol messages that can be queued to each dedicated storage device according to the set of management rules for each dedicated storage device and storage device type.

24. Apparatus of claim 23, wherein the plurality of storage device types includes a plurality of:
   a Fibre Channel storage device type;
   an ATA storage device type;
   a serial attached SCSI storage device type;
   a serial ATA storage device type; and
   a solid state storage device type.

25. Apparatus of claim 23, wherein the plurality of dedicated storage devices include:
   at least one Fibre Channel storage device; and
   at least one ATA storage device.

26. Apparatus of claim 23, wherein the disk controller is further adapted for at least one of:
   identifying a new dedicated storage device using the sets of management rules for the various dedicated storage devices and storage device types;
   configuring each different dedicated storage device according to the set of management rules for the dedicated storage device and storage device type, wherein each dedicated storage device having a different storage device type is configured differently;
   sending disk control protocol messages to the dedicated storage devices, at least some of the disk control protocol messages formatted differently for different dedicated storage devices according to the set of management rules for each dedicated storage device and storage device type;
   writing data to each dedicated storage device using a preferred stripe size for the dedicated storage device according to the set of management rules for each dedicated storage device and storage device type;
   processing disk control protocol messages received from different dedicated storage devices according to the set of management rules for each dedicated storage device and storage device type; and
   handling errors and exceptions for different dedicated storage devices according to the set of management rules for each dedicated storage device and storage device type, wherein each dedicated storage device having a different storage device type has different error and exception handling rules.

* * * * *

UNITED STATES PATENT AND TRADEMARK OFFICE
CERTIFICATE OF CORRECTION

PATENT NO. : 7,237,021 B2  Page 1 of 1
APPLICATION NO. : 10/407145
DATED : June 26, 2007
INVENTOR(S) : Brett A. Penny et al.

It is certified that error appears in the above-identified patent and that said Letters Patent is hereby corrected as shown below:

In Col. 12, line 9
replace "storage device type"
with -- storage device type, --

In Col. 12, line 11
replace "storage devices"
with -- storage devices, --

Signed and Sealed this

Tenth Day of June, 2008

JON W. DUDAS
*Director of the United States Patent and Trademark Office*